(12) United States Patent
Garcia et al.

(10) Patent No.: US 9,319,672 B2
(45) Date of Patent: Apr. 19, 2016

(54) CONTENT-DEPENDENT VIDEO QUALITY MODEL FOR VIDEO STREAMING SERVICES

(71) Applicant: DEUTSCHE TELEKOM AG, Bonn (DE)

(72) Inventors: Marie-Neige Garcia, Berlin (DE); Alexander Raake, Berlin (DE); Savvas Argyropoulos, Chalkida (GR); Bernhard Feiten, Berlin (DE); Peter List, Unna (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/403,595

(22) PCT Filed: Jul. 16, 2013

(86) PCT No.: PCT/EP2013/065033
§ 371 (c)(1),
(2) Date: Nov. 25, 2014

(87) PCT Pub. No.: WO2014/029561
PCT Pub. Date: Feb. 27, 2014

(65) Prior Publication Data
US 2015/0138373 A1    May 21, 2015

(30) Foreign Application Priority Data
Aug. 20, 2012  (EP) .................................... 12181015

(51) Int. Cl.
*H04N 17/00* (2006.01)
*H04N 19/154* (2014.01)
(Continued)

(52) U.S. Cl.
CPC ............ *H04N 17/004* (2013.01); *H04N 19/154* (2014.11); *H04N 19/177* (2014.11); *H04N 19/48* (2014.11); *H04N 19/89* (2014.11)

(58) Field of Classification Search
CPC ... H04N 17/004; H04N 19/89; H04N 19/177; H04N 19/154; H04N 19/48
See application file for complete search history.

(56) References Cited

U.S. PATENT DOCUMENTS

| | | | |
|---|---|---|---|
| 2009/0004114 A1 | 1/2009 | Overweg | |
| 2009/0041114 A1* | 2/2009 | Clark | .................. H04L 43/0829 375/240.01 |

FOREIGN PATENT DOCUMENTS

| | | | | |
|---|---|---|---|---|
| CN | WO 2011134113 A1 * | 11/2011 | ........... | H04N 17/004 |
| DE | WO 2012013655 A1 * | 2/2012  | ........... | H04N 17/004 |

(Continued)

OTHER PUBLICATIONS

Garcia, et al., "Parametric packet-layer video quality model for IPTV", 10th International Conference on Information Science, Signal Processing and their Applications, May 10, 2010, pp. 349-352.

(Continued)

*Primary Examiner* — Joseph Ustaris
*Assistant Examiner* — Jill Sechser
(74) *Attorney, Agent, or Firm* — Leydig, Voit & Mayer, Ltd.

(57) ABSTRACT

A method for estimating the perception quality of a digital video signal includes: (1a) extracting information of the video bit stream, which is captured prior to decoding; (1b) getting estimation(s) for one or more impairment factors IF using, for each of the estimations, an impact function adapted for the respective impairment factor; and (1c) estimating the perceived quality of the digital video signal using the estimation(s) obtained in step (1b).

31 Claims, 3 Drawing Sheets

(51) Int. Cl.
*H04N 19/177* (2014.01)
*H04N 19/48* (2014.01)
*H04N 19/89* (2014.01)

(56) References Cited

FOREIGN PATENT DOCUMENTS

| WO | WO 2009012297 A1 | 1/2009 |
| WO | WO 2012013655 A1 | 2/2012 |
| WO | WO 2012076202 A1 | 6/2012 |
| WO | WO 2013053385 A1 | 4/2013 |

OTHER PUBLICATIONS

Garcia, et al., "Towards content-related features for parametric video quality prediction of IPTV services", Acoustics, Speech and Signal Processing, IEEE International Conference, Mar. 31, 2008, pp. 757-760.

* cited by examiner

CONTENT-DEPENDENT VIDEO QUALITY MODEL FOR VIDEO STREAMING SERVICES

CROSS-REFERENCE TO RELATED APPLICATIONS

This application is a U.S. National Phase application under 35 U.S.C. §371 of International Application No. PCT/EP2013/065033, filed on Jul. 16, 2013, and claims benefit to European Patent Application No. EP 12181015.4, filed on Aug. 20, 2012. The International Application was published in English on Feb. 27, 2014 as WO 2014/029561 under PCT Article 21(2).

FIELD

The invention relates to a method and an apparatus for estimating the perceived quality of a digital video signal, preferably in the context of video streaming services such as Internet Protocol Television (IPTV) or Video on Demand (VoD), and in particular for content-dependent estimations of the perceived quality of a digital video signal by providing content-complexity parameters, and by controlling existing or future parameter-based video quality estimation methods by the provided content-complexity parameters. The invention is suitable for encrypted video streams, but also works on non-encrypted video streams.

BACKGROUND

In order to ensure a high degree of satisfaction for the user of video services such as non-interactive streaming video (IPTV, VoD), the perceived video quality of those services needs to be estimated. It is a major responsibility of the broadcast provider towards both content provider and customer to maintain the quality of its service. In large IPTV networks, only fully automated quality monitoring probes can fulfill this requirement.

To this end, video quality models are developed which provide estimates of the video quality as perceived by the user. Those models can, for instance, output the degree of similarity between the video received at the user's end and the original non-degraded video. In addition, and in a more sophisticated manner, the Human Visual System (HVS) can be modelled. At last, the model output can be mapped to the results of extensive subjective quality tests, to ultimately provide an estimation of perceived quality.

Video quality models and thus measurement systems are generally classified as follows:
Quality Model Types
 Full Reference (FR): a reference signal is required.
 Reduced-Reference (RR): partial information extracted from the source signal is required.
 No-Reference (NR): no reference signal is required.
Input Parameters Types
 signal/media-based: the decoded image (pixel-information) is required.
 parameter-based: bitstream-level information is required. Information can range from packet-header information, requiring parsing of the packet-headers, parsing of the bitstream including payload, that is coding information, and partial or full decoding of the bitstream.
Type of Application
 Network Planning: the model or measurement system is used before the implementation of the network in order to plan the best possible implementation.
 Service Monitoring: the model is used during service operation.
Related Information of the Types of Video Quality Models can be Found in References [1-3].

Several packet-based parametric video quality models have been described in the literature [4-6]. However, a major drawback of these models is that they do not take into account the quality impact of the content. In other terms, and as reported in previous studies [7-12], the perceived video quality depends on the spatio-temporal characteristics of the video. For instance, packet-loss is generally better concealed when there is no complex movement in the video, such as in broadcasting news. When there is no packet-loss and for low and medium bitrates, content with low spatio-temporal complexity achieves better quality than spatio-temporally complex content.

Further publications also aim at including the quality impact of the content into a parameter-based parametric video quality models, for both packet-loss and no-packet-loss cases, cf. Refs. [13a, 13b, 14, 15, 16].

For instance, in Refs. [13a, 13b, 14], the complexity of the contents is determined per video frame by comparing the current frame size with an adaptive threshold. Whether the current frame size is above, equal to or below this threshold will result in increasing or decreasing the estimated quality associated with the current frame. However, due to the use of a threshold value and the resulting three possibilities of being greater, equal or lower than this value, the method disclosed in these references only provides a relatively coarse consideration of the video content. In other words, there is no smooth or continuous measurement of the complexity of the frames within a given measurement window. Moreover, since the adaptive threshold is computed over the complete or part of the measurement window, the complexity of each frame is determined relative to the complexity of other frames in the same video sequence, but not relative to the complexity of other contents.

In Ref. [15], a solution is proposed for inserting content-related parameters, i.e. parameters which reflect the spatio-temporal complexity of the content such as quantization parameter and motion vectors, into a parameter-based video quality model. However, these content-related parameters cannot be extracted from an encrypted bitstream, so that Ref. [15] cannot be used in the same way as the present invention.

Ref. [16] presents a solution for estimating the perceived video quality in case of packet loss with a single parameter, which represents the magnitude of the signal degradation due to packet loss. This solution foresees the inclusion of a correction-factor for adjusting the estimated magnitude of the signal degradation based on the temporal or spatio-temporal complexity of the content. However, no solution is proposed for computing this correcting factor, for example in case of encrypted video.

Consequently, there is still a need for a method for estimating the perceived quality of a digital video signal. On the one hand, such a method should allow for a rather fine-grained consideration of the quality impact of the content of the video signal, and on the other hand it should also be applicable for encrypted video, including both the case of coding degradation with and without packet-loss. There is likewise a need for an apparatus configured for performing a method with these features.

SUMMARY

In an embodiment, the invention provides a method for estimating the perception quality of a digital video signal. The method includes: (1a) extracting information of the video bit stream, which is captured prior to decoding; (1b) getting estimation(s) for one or more impairment factors IF using, for each of the estimations, an impact function adapted for the respective impairment factor; and (1c) estimating the perceived quality of the digital video signal using the estimation(s) obtained in step (1b). Each of the impact functions used in step (1b) takes as input a set of content-dependent parameters q computed from a set of Group Of Picture (GOP)/scene-complexity parameters. The GOP/scene-complexity parameters are derivable from packet-header information and available in case of encrypted video bit streams. The set of content-dependent parameters q is derived at least from a GOP/scene-complexity parameter $S_{sc}^I$, denoting the average I frame size per scene. For estimating at least one of the impairment factors, an impact function $f_{IF}$ is used that depends on a content-dependent parameter $q_1$ being computed from the reciprocal of the weighted mean of the GOP/scene-complexity parameter $S_{sc}^I$, over the scenes sc multiplied by a coefficient. Each scene sc has a weight of $w_{sc} \times N_{sc}$ with $N_{sc}$ being the number of GOPs per scene and $w_{sc}$ being a weight factor, wherein for the scenes having the lowest $S_{sc}^I$ value: $w_{sc}$ is set to a value greater than 1, and for all other scenes: $w_{sc}$ is set equal to 1.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
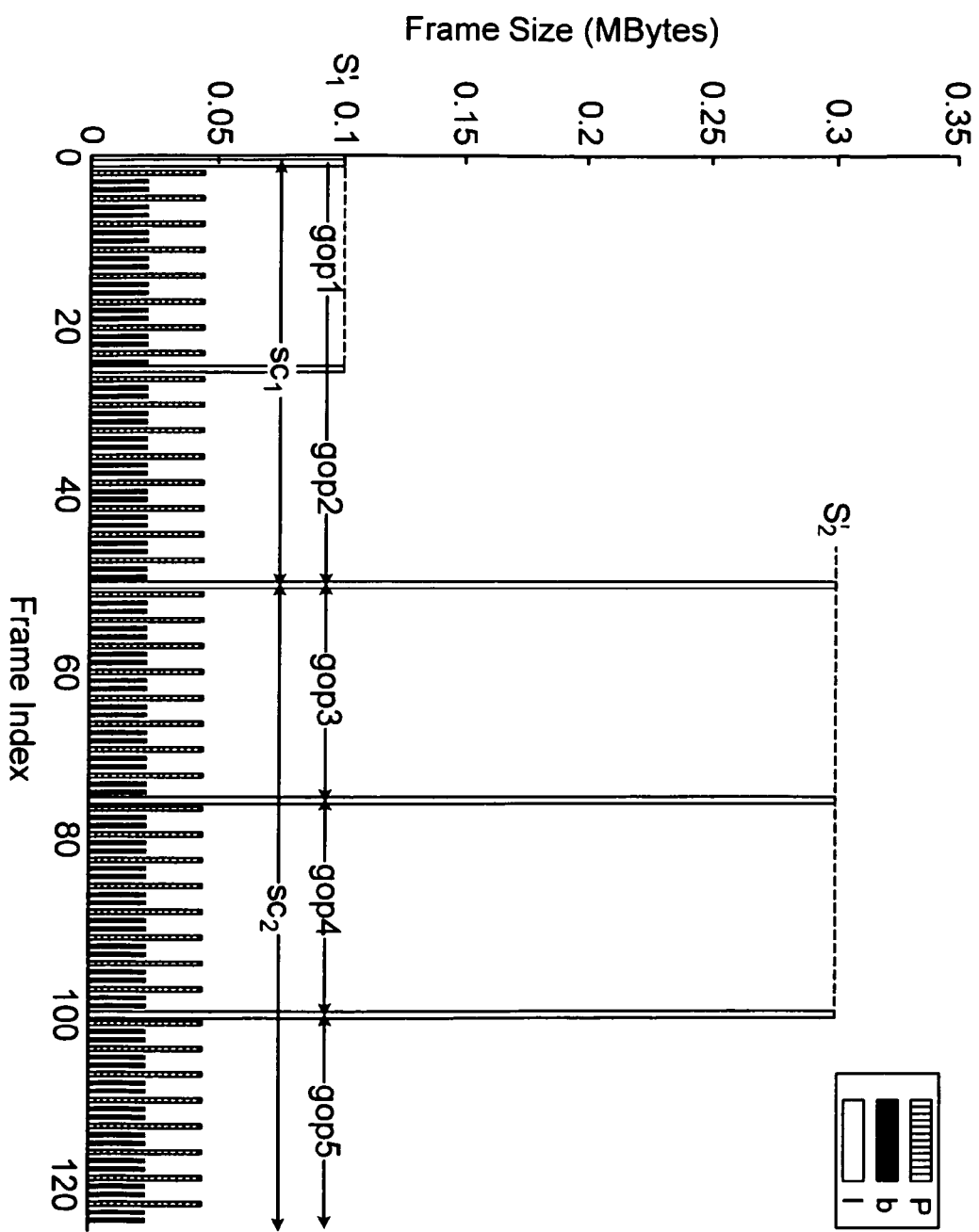
FIG. 1: Illustration of the computation of Eq. (10) used as an example for accounting for the quality impact of the content in the no loss case.

The invention includes targeting the use with parameter-based video quality models in case of encrypted-video, i.e. where only packet-header information is available. The invention also works in case of non-encrypted video, but may be by design less accurate than a video quality model based on fully decoding or extracting deeper information from the unencrypted bitstream. Only making use of packet-based information offers the advantage of keeping the computational complexity of the invention low, and of course extends the application range to non-encrypted as well as encrypted streams.

In an embodiment, the present invention provides a method for estimating the perceived quality of a digital video signal by providing content-complexity parameters and using these content-complexity parameters for controlling arbitrary—and thus existing or prospective—parameter-based video quality estimation methods. The method according to the invention on the one hand allows for a rather fine-grained consideration of the quality impact of the content of the video signal, but on the other hand also is applicable for encrypted video and for both, the packet-loss case as well as the no-loss case. The invention further provides an apparatus configured for computing content-complexity parameters and inserting them into arbitrary parameter-based video quality models, with all the advantages such packet-header-based approaches are associated with.

It shall also be noted that the present invention substantially differs from the approaches of the references cited above [13a, 13b, 14] by both the content-related parameters that are computed, and the way in which these parameters are included into the models. In the present invention, the content-related parameters are provided as absolute values, which are not dependent on the history of frames as disclosed in Refs. [13a, 13b, 14]. Hence, they could be used for comparing the complexity of two different contents, or of different scenes or passages of one content. Moreover, the values of the content-related parameters used in the present invention are continuous—and not categorical in terms of indistinct classes as in [13a, 13b, 14]—and thus allow a very fine-grained estimation of the quality impact of the content. In addition, in the present invention, all parameters are computed either over the whole measurement window, per Group Of Picture (GOP) or per video scene, while in these publications (cf. Refs. [13a, 13b, 14]), they are computed per frame.

Note that in case of encrypted video, the GOP structure can be estimated using [20]. Further note that a (video) scene starts with an I-frame and generally contains several GOPs. The scene cuts can be detected in case of encrypted video using Ref. [21] (not published prior to the filing date of the present application). Two video scenes usually differ by their semantic contents. Moreover, the intra-scene variation of the spatio-temporal (ST) complexity of the content signal is generally lower than its inter-scene variation.

Two common ways of expressing the estimated video quality Qv based on contributions from different types of degradations are shown in the following equations, $$Qv = Qvo - Icod - Itra, \quad (1)$$

$$Qv = Qvo \times Icod \times Itra, \quad (2)$$

wherein Icod and Itra are examples of "impairment factors" (IF). An impairment factor quantifies the quality impact of a specific degradation type, and each impairment factor can be computed from a parametric description of the signals and the transmission path. In Eqs. (1) and (2), Icod represents the quality impact of compression artifacts, and Itra represents the quality impact of transmission errors (packet loss). Note that in Eq. (2) and throughout the whole application, the symbol "×" shall denote the usual multiplication between two real numbers, which is sometimes also denoted by the symbol ".".

All terms in Eqs. (1) and (2) are, for instance, expressed on a scale from 0 to 100, or from 1 to 5.

Qvo is the base quality and typically corresponds to the highest value of the scale used for expressing the perceived quality, for instance Qvo=100 or Qvo=5.

According to the invention, Icod and Itra, and thus Qv can be computed per measurement window, one measurement window typically lasting from 10 to 20 seconds.

Another approach, followed for example by Refs. [13] and [14], is to compute image-related quality contributions due to coding and packet loss per video frame. The obtained set of video frame quality values is then aggregated over the measurement window. One straightforward way of aggregating the per-frame video quality values is to take the average. More sophisticated ways are described in Refs. [17-19].

In the following, Icod, Itra, and Qv are computed per measurement window. Furthermore, both Icod and Itra are calculated using a function of the following form, which will in the following also be referred to as "impact function":

$$f_{IF}: \mathbb{R}^m \times \mathbb{R}^n \times \mathbb{R}^u \to \mathbb{R}, (p^{IF}, q^{IF}, a^{IF}) \mapsto Imp := f^{IF}(p^{IF}, q^{IF}, a^{IF}), \quad (3)$$

with Imp $\in \{$Icod, Itra$\}$, m, n, and u being positive integers, $f_{IF}$ being an impact function depending on the (upper) index IF denoting the respective impairment factor, and wherein $$p^{IF} = (p_1^{IF}, \ldots, p_m^{IF}) \in \mathbb{R}^m \quad (4)$$

denotes a first set of parameters which relates to encoding or network technical characteristics such as the bitrate, the frame rate or the percentage of packet-loss, and $$q^{IF} = (q_1^{IF}, \ldots, q_n^{IF}) \in \mathbb{R}^n \quad (5)$$

denotes a second set of parameters, in the following also referred to as "content-dependent" parameters, which are derived from GOP/scene-complexity parameters defined below, and $$\alpha^{IF} = (\alpha_1^{IF}, \ldots, \alpha_u^{IF}) \in \mathbb{R}^u \quad (6)$$

denotes a set of coefficients associated with $f_{IF}$. In the following, the superscript IF will sometimes be suppressed in the notation of the quantities as given by Eqs. (4) to (6) for the sake of simplicity.

Here, $p^{IF}$ and $q^{IF}$ are preferably computed for each measurement window, one measurement window typically lasting from 10 to 20 seconds. In the following, the upper index IF will be termed according to the respective name of the variable used for quantification or measurement of a specific impairment factor, i.e., for example, Icod or Itra. Moreover, the application of Eq. (3) is not limited to the cases of the impairment factors Icod and Itra; Eq. (3) can rather be applied also to other types of quality degradations, i.e., to other impairment factors.

Note that an impact function according to Eq. (3) constitutes a general concept for estimating the content-related contribution to impairment factors. In other words, Eq. (3) is not only applicable to different impairment factors such as Icod or Itra, but also applies to various (parameter-based) models for estimating the quality degradation due to a specific impairment factor, e.g., Icod. By using the content-dependent parameters as described by a set $q^{IF}$ in a specific realization of Eq. (3) adapted for one chosen estimation method for an impairment factor, the estimation of this impairment factor becomes controlled by the content-dependent parameters. When the final step of calculating an estimation of the perceived "overall" quality Qv of the video signal is performed, for example by employing Eqs. (1) or (2) or any other method based on estimations of one or more impairment factors, also the estimation of Qv is controlled by the content-dependent parameters. This way, the method according to the invention allows for the above mentioned fine-grained consideration of the quality impact due to the content of the video signal.

The GOP/scene-complexity parameters used for computing the content-dependent parameters $q^{IF}$ are all parameters requiring knowledge on the type and size (e.g. in bytes) of the video frames. These parameters are usually—but not necessarily—calculated per Group of Picture (GOP) or video scene (SC), and the parameters or the resulting quality estimation is then aggregated over the measurement window.

According to the invention, at least the following GOP/scene-complexity parameters can be considered:
$S_{sc}^I$: average I frame size for given scene sc; in the preferred embodiment, the first I frame of the first scene is preferably ignored,
$S_{gop}^P$: average P frame size for given GOP gop,
$S_{gop}^B$: average size of reference B (used in case of hierarchical coding) per GOP,
$S_{gop}^b$: average size of non-reference b frame sizes per GOP,
$S_{gop}^{noI}$: averaged P, B and b frame sizes per GOP,
$B_{sc}^I$: bitrate of I frames computed per scene,
$B_{sc}^P$: bitrate of P frames computed per scene,
$B_{sc}^B$: bitrate of B frames computed per scene,
$B_{sc}^b$: bitrate of b frames computed per scene,
$B_{sc}^{noI}$: joint bitrate of P, B and b frames computed per scene.

In the above symbols, the frame sequence type, i.e. I, P, B, b, or noI, is indicated by an upper index, which is not to be confused with an exponent.

The bitrate per scene of the frames with frame type T ($B_{sc}^T$ where $T \in \{I, P, B, b, noI\}$) is computed as follows:

$$B_{sc}^T = \frac{By_{sc}^T \times fr^T}{nfr^T \times nr^T}, \quad (7)$$

where
$By_{sc}^T$: is the total amount of bytes for frame T for each scene,
$fr^T$ is the frame rate for T frames, i.e. the number of T frames per second,
$nfr^T$ is the number of T frames in the scene,
br is the overall bitrate, in Mbit/s.

As an alternative, $fr^T$ could be replaced by the overall frame rate fr and $nfr^T$ by the overall number nfr of frames in the scene.

Additionally, the following ratios can be considered as GOP/scene-complexity parameters. Each ratio is computed per GOP from the GOP/scene-complexity parameters as defined above:
$S^{P/I} = S_{gop}^P / S_{sc}^I$
$S^{b/I} = S_{gop}^b / S_{sc}^I$
$S^{b/P} = S_{gop}^b / S_{gop}^P$
$S^{noI/I} = S_{gop}^{noI} / S_{sc}^I$
$B^{P/I} = B_{sc}^P / B_{sc}^I$
$B^{b/I} = B_{sc}^b / B_{sc}^I$
$B^{b/P} = B_{sc}^b / B_{sc}^P$
$B^{noI/I} = B_{sc}^{noI} / B_{sc}^I$ Also here, the superscript of the symbols of the left- and right-hand side of the equations is meant as an upper index.

One aspect of the invention relates to a method for estimating the perception quality of a digital video signal, the method comprising the steps of:
(1a) extracting information of the video bit stream, which is captured prior to decoding;
(1b) getting estimation(s) for one or more impairment factors IF using, for each of the estimations, an impact function adapted for the respective impairment factor;
(1c) estimating the perceived quality of the digital video signal using the estimation(s) obtained in step (1b);
the method being characterised in that each of the impact functions used in step (1b) takes as input a set of content-dependent parameters q computed from a set of GOP/scene-complexity parameters, wherein the GOP/scene-complexity parameters are derivable from packet-header information and available in case of encrypted video bit streams.

According to the method of the invention, the GOP/scene-complexity parameters may be calculated per Group of Picture (GOP) or per video scene.

According to one embodiment of the method, each of the impact functions used in step (1b) further depends on:
encoding or network technical characteristics, for example the bit rate, the frame rate, the percentage of packet-loss, or the proportion of loss in a GOP or scene; and/or coefficients associated with the impact function.

In one preferred embodiment of the invention, the set of content-dependent parameters q is derived from at least one of the following GOP/scene-complexity parameters:

$S_{sc}^{I}$, denoting the average I frame size per scene, wherein the first I frame of the first scene is preferably ignored;
$S_{gop}^{P}$, denoting the average P frame size per GOP;
$S_{gop}^{B}$, denoting the average (reference) B frame sizes per GOP;
$S_{gop}^{b}$, denoting the average non-reference b frame sizes per GOP;
$S_{gop}^{noI}$, denoting the joint average P, B and b frame sizes per GOP;
$B_{sc}^{I}$, denoting the bitrate of I frames computed per scene;
$B_{sc}^{P}$, denoting the bitrate of P frames computed per scene;
$B_{sc}^{B}$, denoting the bitrate of B frames computed per scene;
$B_{sc}^{b}$, denoting the bitrate of b frames computed per scene;
$B_{sc}^{noI}$, denoting the bitrate of P, B, and b frames computed per scene.

In one embodiment of the invention, the set of parameters q is derived from at least one of the following GOP/scene-complexity parameters:

$S^{P/I}=S_{gop}^{P}/S_{sc}^{I}$
$S^{b/I}=S_{gop}^{b}/S_{sc}^{I}$
$S^{b/P}=S_{gop}^{b}/S_{gop}^{P}$
$S^{noI/I}=S_{gop}^{noI}/S_{sc}^{I}$
$B^{P/I}=B_{sc}^{P}/B_{sc}^{I}$
$B^{b/I}=B_{sc}^{b}/B_{sc}^{I}$
$B^{b/P}=B_{sc}^{b}/B_{sc}^{P}$
$B^{noI/I}=B_{sc}^{noI}/B_{sc}^{I}$ In one embodiment, an impact function $f_{IF}$ is used.

Preferably, the impact function $f_{IF}$ is used for estimating the quality impact due to compression artifacts, that depends on a content-dependent parameter $q_1$ being computed from the reciprocal of the weighted mean of the GOP/scene-complexity parameter $S_{sc}^{I}$ over the scenes sc multiplied by a coefficient. The coefficient may be proportional to the number of pixels per video frame nx and the video frame rate fr.

In a preferred embodiment of the invented method, each scene sc has a weight of $w_{sc} \times N_{sc}$ with $N_{sc}$ being the number of GOPs per scene and $w_{sc}$ being a further weight factor, wherein for the scenes having the lowest $S_{sc}^{I}$ value: $w_{sc}$ is set to a value greater than 1, for example $w_{sc}=16$, and for all other scenes: $w_{sc}$ is set equal to 1.

In one embodiment, the content-dependent parameter $q_1$ is given by $$q_1 = \frac{\sum_{sc} w_{sc} \times N_{sc}}{\sum_{sc} S_{sc}^{I} \times w_{sc} \times N_{sc}} \times \frac{nx \times fr}{1000}.$$

In case of a one-dimensional parameter set (parameter vector), the symbol of the only element of the set shall be identified with the symbol of the set for the sake of simplicity in the following. For example, if the set of content-dependent parameters has only one parameter, i.e. $q=(q_1)$, it will be simply written $q=q_1$. Analogously, it is set $p=(p_1)=p_1$ in case of a one-dimensional set of parameters associated with the encoding or network technical characteristics.

In one embodiment of the invented method, the impact function $f_{IF}$ depending on the content-dependent parameter $q=q_1$ is given by $$f_{IF}(p,q,\alpha)=\alpha_1 \times \exp(\alpha_2 \times p_1)+\alpha_3 \times q_1+\alpha_4,$$

wherein $p=p_1$ is preferably a parameter describing the number of bits per pixel and given most preferably by $$p_1 = \frac{bitrate \times 10^6}{nx \times fr},$$

and
wherein $\alpha=(\alpha_1, \alpha_2, \alpha_3, \alpha_4)$ is the set of coefficients associated with the impact function.

In one embodiment of the invented method, an impact function $f_{IF}$ is used, preferably for estimating the quality impact due to transmission artifacts, that depends on a set of content-dependent parameters $q=(q_1, q_2)$, each component $q_j$ with $j \in \{1, 2\}$ of the set being obtained by a weighted sum of parameters $\beta_{k,j}$ dependent on GOP/scene-complexity parameters, the weighted sum for each $j \in \{1, 2\}$ preferably computed according to $$q_j = \sum_{k=1}^{v} \beta_{k,j} \times R_{k,j}$$

with weights $R_{k,j}$.
The weights may be given by $$R_{k,j} = \sum_{i} r_i \times (T_k - t_i) \text{ for } j \in \{1, 2\}$$

with $T_k$ being the loss duration of GOP k, $t_i$ being the location in the GOP of a loss event i and $r_i$ denoting the spatial extent of loss event i.

According to a preferred embodiment, one uses:
in case of one slice per frame, $$r_i = \frac{nap}{np};$$

and
in case of more than one slice per frame, $$r_i = \frac{nlp}{np} + nle \times \frac{1}{2 \times nsl};$$

wherein np is the number of packets in the frame, nap is the number of affected transport streams (TS) packets in the hit frame, nlp is the number of lost packets in the frame, nle is the number of loss events in the frame, and nsl is the number of slices in the frame.

The parameter $\beta_{k,1}$ may depend on the GOP/scene-complexity parameter $S^{noI/I}$.

The parameter $\beta_{k,2}$ may depend on the GOP/scene-complexity parameter $S^{noI/P}$.

According to one embodiment of the method, the parameters $\beta_{k,1}$ for each $k \in \{1, \ldots, v\}$ are obtained by the following steps:

(12a) setting $\beta_{k,1} = S^{noI/I}$;

(12b) in case of $\beta_{k,1} \leq 0.5$, setting $\beta_{k,1}$ to $2 \times \beta_{k,1}$;

(12c) in case of $\beta_{k,1} > 0.5$, setting $\beta_{k,1}$ to 1.

Preferably, the parameters $\beta_{k,2}$ for each $k \in \{1, \ldots, v\}$ are obtained as $\beta_{k,2} = \max(0, -S^{b/P} + 1)$.

In one embodiment, the impact function $f_{IF}$ depending on the set of content-dependent parameters $q = (q_1, q_2)$ is given by $$f_{IF}(p, q, \alpha) = \alpha_1 \times \log\left(1 + \frac{\alpha_2 \times q_1 + \alpha_3 \times q_2}{p_1 \times p_2}\right),$$

wherein $\alpha = (\alpha_1, \alpha_2, \alpha_3)$ is the set of coefficients associated with the impact function.

Preferably, $p_1$ is a parameter describing the quality impact due to compression artifacts.

Preferably, $p_2$ is the number of GOPs in the measurement window or the measurement window duration.

In one embodiment of the inventive method, the video signal is at least part of a non-interactive data stream, preferably a non-interactive video or audiovisual stream, or at least part of an interactive data stream, preferably an interactive video or audiovisual stream.

In one embodiment, the method is combined with one or more methods for estimating the impact on the perception quality of a digital video signal by other impairments than compression and/or transmission, wherein the combination is preferably performed using at least a linear function and/or at least a multiplicative function of the methods to be combined.

In one embodiment, the method is combined with one or more other methods for estimating the perception quality of a digital video by compression and/or transmission, wherein the combination is preferably performed using at least a linear function and/or at least a multiplicative function of the methods to be combined.

One aspect of the invention relates to a method for monitoring the quality of a transmitted digital video signal with the steps of:

(18a) transmitting the video signal from a server to the client;

(18b) client-side executing the method for estimating the perception quality of a digital video signal according to the method for estimating the perception quality of a digital video signal as disclosed above;

(18c) transferring the result of the estimation of step (18b) to the server;

(18d) server-side monitoring the estimation of the quality of the transmitted video signal; and the method preferably comprising the further steps of:

(18e) analysing the monitored quality of the transmitted video signal, preferably in dependence of transmission parameters; and optionally (18f) changing the transmission parameters based on the analysis of step (18e) in order to increase the quality of the transmitted video signal.

One aspect of the invention relates to an apparatus for estimating the perception quality of a digital video signal, the apparatus comprising:

a means configured for extracting information from a video bit stream being captured prior to decoding;

at least one impact estimator;

a quality estimator configured for estimating the perception quality Qy of the video signal;

the apparatus being characterised in that each of the impact estimator(s) is configured for estimating the quality impact due to an impairment factor by means of an impairment function taking as input a set of content-dependent parameters computed from a set of GOP/scene-complexity parameters, wherein the GOP/scene-complexity parameters are derivable from packet-header information and thus available in case of encrypted video bit streams.

The apparatus preferably is further configured to estimate the perception quality of a digital video signal using a method according to any one of the embodiments of the method for estimating the perception quality of a digital video signal as described above.

One aspect of the invention relates to a set top box connectable to a receiver for receiving a digital video signal, wherein the set top box comprises the apparatus according to the invention.

One aspect of the invention relates to a system for monitoring the quality of a transmitted digital video signal, the system comprising a server and a client, and the system being configured for executing the method for monitoring the quality of a transmitted digital video signal according to the invention as disclosed above.

In one embodiment of the system, the client is configured as apparatus according to the invention.

In one embodiment of the system, the client comprises an apparatus according to the invention.

In an alternative embodiment of the invented system, the system further comprises the set top box according to the invention, wherein the set top box is connected to the client.

Other aspects, features, and advantages will be apparent from the summary above, as well as from the description that follows, including the figures and the claims.

According to the invention, the content-complexity-impact on both the compression-related quality impairment Icod and the transmission-related quality impairment Itra can be estimated using the scheme described in the following:

No Loss Case—Icod

One embodiment of the invention relates to the inclusion of GOP/scene-complexity parameters into Eq. (3), wherein Imp=Icod, m=1, n=1, u=4, and wherein Imp is obtained by $f_{Icod}$ being an exponential function:

$$f_{Icod}(p^{Icod}, q^{Icod}, \alpha^{Icod}) = \alpha_1^{Icod} \times \exp(\alpha_2^{Icod} \times p_1^{Icod}) + \alpha_3^{Icod} \times q_1^{Icod} + \alpha_4^{Icod} \quad (8)$$

As an example of the set of coefficients $\alpha^{Icod}$ in Eq. (8), we have:

$\alpha_1^{Icod} = 47.78$, $\alpha_2^{Icod} = 21.46$, $\alpha_3^{Icod} = 7.61$, $\alpha_4^{Icod} = 7.71$, and preferably $p_1^{Icod}$ is the average number of bits per pixel given most preferably by $$p_1^{Icod} = \frac{br \times 10^6}{nx \times fr}, \quad (9)$$

wherein nx and fr are the number of pixels per video frame and the video frame rate, respectively. Moreover, br is the video bitrate in Mbit/s.

In a preferred embodiment, $q_1^{Icod}$ is a function of the GOP/scene-complexity parameter $S_{sc}^I$ and is expressed as follows:

$$q_1^{Icod} = \frac{\sum_{sc} w_{sc} \times N_{sc}}{\sum_{sc} S_{sc}^I \times w_{sc} \times N_{sc}} \times \frac{nx \times fr}{1000}, \quad (10)$$

wherein nx and fr are the number of pixels per video frame and the video frame rate, respectively, and $N_{sc}$ is the number of GOPs per scene. For the scene having the lowest $S_{sc}^I$ value, $w_{sc} > 1$, wherein preferably $w_{sc} = 16$, otherwise $w_{sc} = 1$.

FIG. 1 illustrates as an example the computation of equation (10) with a video sequence composed of two scenes (it is assumed that the measurement window corresponds to the duration of this video sequence). The format of the video sequence is 1080p25. As a consequence, nx=1920×1080=2073600 and fr=25.

The first scene (sc=1) contains two GOPs (gop1 and gop2), i.e. $N_1=2$, and its average I-frame size is $S_1^I=0.1$ (e.g. in Megabytes).

The second scene (sc=2) contains three GOPs (gop3 to gop5), i.e. $N_2=3$, and its average
I-frame size is $S_2^I=0.3$ (e.g. in Megabytes).

The minimum $S_{sc}^I$ in the video sequence is $S_1^I$. As a consequence,
$w_1=16$,
$w_2=1$,
and $$q_1^{Icod} = \frac{16 \times 2 + 3 \times 1}{0.1 \times 10^6 \cdot 16 \times 2 + 0.3 \times 10^6 \times 3 \times 1} \times \frac{2073600 \times 25}{1000} = 0.4425.$$

Lossy Case—Itra

One embodiment of the invention relates to the inclusion of GOP/scene-complexity parameters into equation (3), wherein Imp=Itra, m=2, n=2, u=3, and wherein Imp is obtained by $f_{Itra}$ being a logarithmic function:

$$f_{Itra}(p^{Itra}, q^{Itra}, \alpha^{Itra}) = \alpha_1^{Itra} \times \log\left(1 + \frac{\alpha_2^{Itra} \times q_1^{Itra} + \alpha_3^{Itra} \times q_2^{Itra}}{p_1^{Itra} \times p_2^{Itra}}\right). \quad (11)$$

As an example of the set of coefficients $\alpha^{Itra}$ in Eq. (11), one has:
$\alpha_1^{Itra}=17.95$,
$\alpha_2^{Itra}=\alpha_3^{Itra}=59.02$
Preferably,
$p_1^{Itra}=Icod$.
$p_2^{Itra}=v$,
wherein v is the number of GOPs in the measurement window. Alternatively, v is the measurement window duration.

In the preferred embodiment, $q_1^{Itra}$ and $q_2^{Itra}$ are derived from GOP/scene-complexity parameters and they are obtained per measurement window using the following relations:

$$q_1^{Itra} = \sum_{k=1}^{v} \beta_{k,1} \times R_{k,1}, \quad (12)$$

$$q_2^{Itra} = \sum_{k=1}^{v} \beta_{k,2} \times R_{k,2}, \quad (13)$$

wherein v is the number of GOPs in the measurement window, and $R_{k,1}$ and $R_{k,2}$ are spatio-temporal descriptors of the loss computed for each GOP k, that are computed as follows:

$$R_{k,1} = R_{k,2} = R_k = \sum_i r_i \times (T_k - t_i), \quad (14)$$

with $T_k$ being the loss duration of GOP k, $t_i$ being the location in the GOP of a loss event i and $r_i$ denoting the spatial extent of loss event i, and wherein preferably:

in case of one slice per frame, $r_i = \frac{nap}{np}$; and  (15)

in case of more than one slice per frame,  (16)
$r_i = \frac{nlp}{np} + nle \times \frac{1}{2 \times nsl}$;

wherein np is the number of packets in the frame, nap is the number of affected transport stream (TS) packets in the hit frame (derived using any method involving packet header information such as sequence numbers, time stamps etc.), nlp is the number of lost packets in the frame, nle is the number of loss events in the frame, and nsl is the number of slices in the frame.

Note that $r_k$ is xl_k/T_k of equation (5) in Ref. [16]. Similarly, $r_i$ of Eq. (15) corresponds to xl_i of equation (7c) in Ref. [16], and rt in Eq. (16) corresponds to xl_i in the equation (7) of Ref. [16]. At last, the summation of $\beta_{k,1}$ and $\beta_{k,2}$ of Eqs. (12) and (13) corresponds to the correcting factor in the equation (9a) of Ref. [16]. However, as previously mentioned, no solution is proposed for computing this correcting factor in case of encrypted video.

Further, the parameters $\beta_{k,1}$ and $\beta_{k,2}$ are derived from GOP/scene-complexity parameters and are computed for each GOP k.

Figure 2:
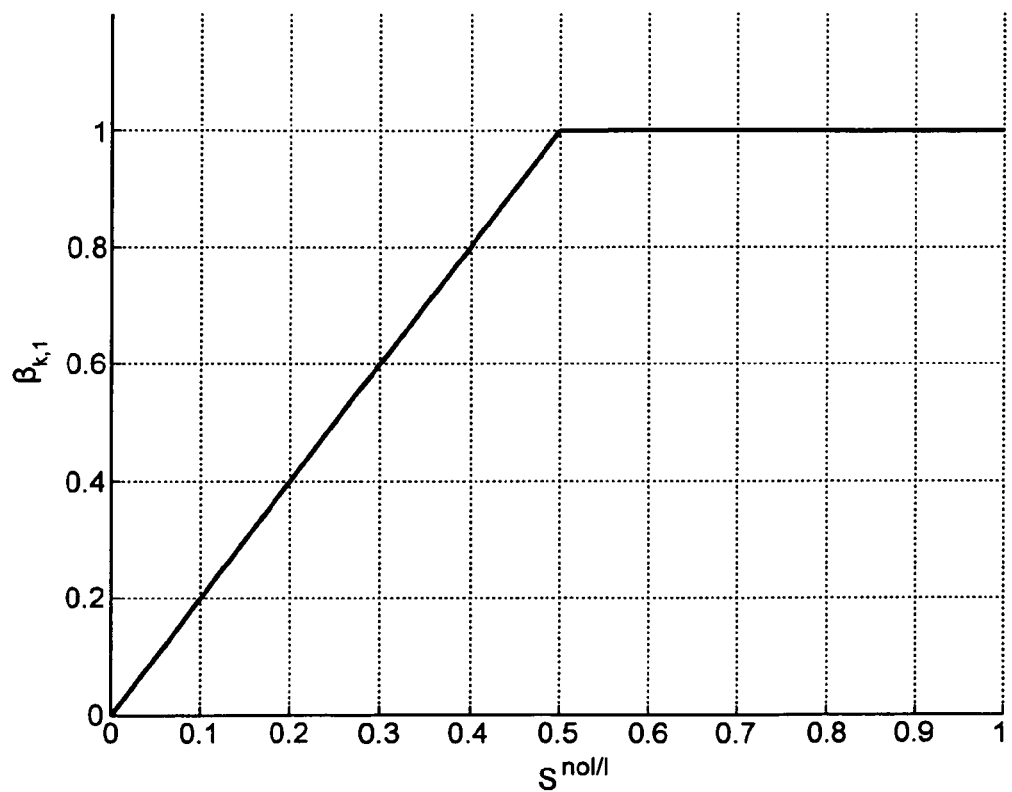
FIG. 2: Illustration of Eqs. (17a) to (17c) used as an example for accounting for the quality impact of the content in case of packet loss.

In a preferred embodiment, is obtained using the following steps (see FIG. 2):

(a) setting $\beta_{k,1} = S^{noI/I}$  (17a)

(b) in case of $\beta_{k,1} \leq 0.5$, setting $\beta_{k,1}$ to $2 \times \beta_{k,1}$  (17b)

(c) in case of $\beta_{k,1} > 0.5$, setting $\beta_{k,1}$ to 1.  (17c)

Figure 3:
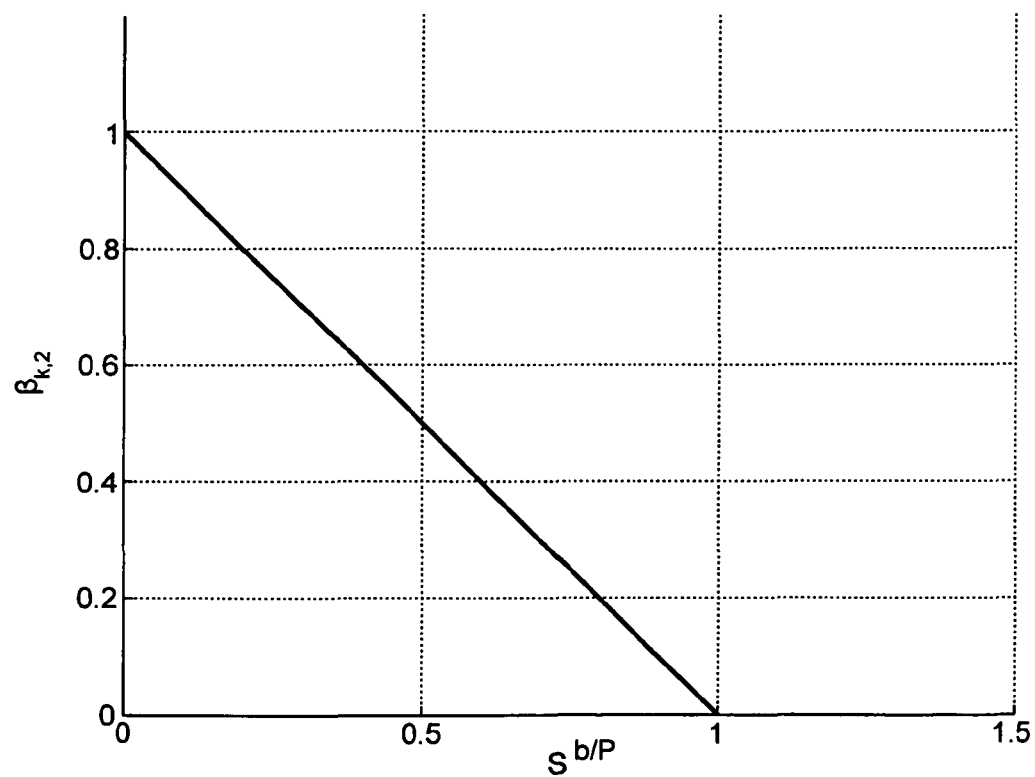
FIG. 3: Illustration of Eq. (18) used as an example for accounting for the quality impact of the content in case of packet loss.

In a preferred embodiment, $\beta_{k,2}$ is obtained using (see FIG. 3):

$\beta_{k,2} = \max(0, -S^{b/P}1)$.  (18)

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[1] A. Takahashi, D. Hands, and V. Barriac, "Standardization Activities in the ITU for a QoE Assessment of IPTV," in IEEE Communication Magazine, 2008.

[2] S. Winkler and P. Mohandas, "The Evolution of Video Quality Measurement: From PSNR to Hybrid Metrics," in IEEE Trans. Broadcasting, 2008.

[3] A. Raake, M. N. Garcia, S. Moeller, J. Berger, F. Kling, P. List, J. Johann, and C. Heidemann, "T-V-MODEL: Parameter-based prediction of IPTV quality," in Proc. of ICASSP, 2008.

[4] O. Verscheure, P. Frossard, and M. Hamdi, "User-oriented QoS analysis in MPEG-2 video delivery," in Real-Time Imaging, 1999.

[5] K. Yamagishi and T. Hayashi, "Parametric Packet-Layer Model for Monitoring Video Quality of IPTV Services," in Proc. of ICC, 2008.

[6] M-N. Garcia and A. Raake, "Parametric Packet-Layer Video Quality Model for IPTV," in Proc. of ISSPA, 2010.

[7] S. Péchard, D. Barba, and P. Le Callet, "Video quality model based on a spatio-temporal features extraction for H.264-coded HDTV sequences," in Proc. of PCS, 2007.

[8] Y. Liu, R. Kurceren, and U. Budhia, "Video classification for video quality prediction," in Journal of Zhejiang University Science A, 2006.

[9] M. Ries, C. Crespi, O. Nemethova, and M. Rupp, "Content-based Video Quality Estimation for H.264/AVC Video Streaming," in Proc. of Wireless Communications and Networking Conference, 2007.

[10] A. Khan, L. Sun, and E. Ifeachor, "Content clustering based video quality prediction model for MPEG4 video streaming over wireless networks," in Proc. of ICC, 2009.

[11] Garcia, M.-N., Schleicher, R. and Raake, A. "Towards A Content-Based Parametric Video Quality Model For IPTV", in Proc. Of VPQM, 2010.

[12] Guangtao Zhai et al, Cross-dimensional Quality Assessment for Low Bitrate Video, in IEEE Transactions on Multimedia, 2008.

[13a] Clark, A. (Telchemy), WO 2009012297 (A1), Method and system for content estimation of packet video streams.

[13b] Clark, A. (Telchemy), US 2009/004114 (A1), Method and system for viewer quality estimation of packet video streams.

[14] Liao, Ning et al, "A packet-layer video quality assessment model with spatiotemporal complexity estimation", EURASIP Journal on Image and Video Processing 2011, 2011:5 (22 Aug. 2011)

[15] Garcia, M.-N., Schleicher, R. and Raake, A. (2010). Towards A Content-Based Parametric Video Quality Model For IPTV. Fifth International Workshop on Video Processing and Quality Metrics for Consumer Electronics (VPQM 2010). Intel, 20-25.

[16] WO 2012/076202 ("Method and apparatus for assessing the quality of a video signal during encoding and transmission of the video signal")

[17] Rosenbluth, J. H. (AT&T) "ITU-T Delayed Contribution D.064: Testing the quality of connections having time varying impairments", 1998

[18] Gros, L., Chateau, N. "Instantaneous and Overall Judgements for Time-Varying Speech Quality: Assessments and Relationships, Acta Acustica, Volume 87, Number 3, May/June 2001, pp. 367-377(11)

[19] Weiss, B., Möller, S., Raake, A., Berger, J., Ullmann, R. (2009). Modeling Conversational Quality for Time-varying Transmission Characteristics, Acta Acustica united with Acustica 95, 1140-1151.

[20] WO/2012/013655 ("Method for estimation of the type of the group of picture structure of a plurality of video frames in a video stream")

[21] PCT/EP2011/067741 (Argyropoulos, S. et al, "Scene change detection for perceptual quality evaluation in video sequences"). PCT/EP2011/067741 is a document having a filing date prior to the filing date of the present application, but which was not published prior to the filing date of the present application.

The invention claimed is:

1. A method for estimating the perception quality of a digital video signal, the method comprising the steps of:
   (1a) extracting information of the video bit stream, which is captured prior to decoding;
   (1b) getting estimation(s) for one or more impairment factors IF using, for each of the estimations, an impact function adapted for the respective impairment factor;
   (1c) estimating the perceived quality of the digital video signal using the estimation(s) obtained in step (1b);
   wherein each of the impact functions used in step (1b) takes as input a set of content-dependent parameters q computed from a set of Group Of Picture (GOP)/scene-complexity parameters, wherein the GOP/scene-complexity parameters are derivable from packet-header information and available in case of encrypted video bit streams;
   wherein the set of content-dependent parameters q is derived at least from a GOP/scene-complexity parameter $S_{sc}^I$, denoting the average I frame size per scene; and
   wherein for estimating at least one of the impairment factors, an impact function $f_{IF}$ is used that depends on a content-dependent parameter $q_1$ being computed from the reciprocal of the weighted mean of the GOP/scene-complexity parameter $S_{sc}^I$ over the scenes sc multiplied by a coefficient; and
   wherein each scene sc has a weight of $w_{sc} \times N_{sc}$ with $N_{sc}$ being the number of GOPs per scene and $w_{sc}$ being a weight factor, wherein for the scenes having the lowest $S_{sc}^I$ value: $w_{sc}$ is set to a value greater than 1, and for all other scenes: $w_{sc}$ is set equal to 1.

2. The method of claim 1, wherein the coefficient is proportional to the number of pixels per video frame nx and the video frame rate fr.

3. The method of claim 1, wherein the content-dependent parameter $q_1$ is given by $$q_1 = \frac{\sum_{sc} w_{sc} \times N_{sc}}{\sum_{sc} S^l_{sc} \times w_{sc} \times N_{sc}} \times \frac{nx \times fr}{1000}.$$

4. The method of claim 1, wherein the GOP/scene-complexity parameters are calculated per GOP or per video scene.

5. The method of claim 1, wherein each of the impact functions used in step (1b) further depends on:
encoding or network technical characteristics.

6. The method of claim 1, wherein each of the impact functions used in step (1b) further depends on:
coefficients associated with the impact function.

7. The method of claim 1, wherein each of the impact functions used in step (1b) further depends on:
encoding or network technical characteristics; and
coefficients associated with the impact function.

8. The method of claim 1, wherein the set of content-dependent parameters q is further derived from at least one of the following GOP/scene-complexity parameters:
$S_{gop}^{P}$, denoting the average P frame size per GOP;
$S_{gop}^{B}$, denoting the average (reference) B frame sizes per GOP;
$S_{gop}^{b}$, denoting the average non-reference b frame sizes per GOP;
$S_{gop}^{noI}$, denoting the joint average P, B and b frame sizes per GOP;
$B_{sc}^{I}$, denoting the bitrate of I frames computed per scene;
$B_{sc}^{P}$, denoting the bitrate of P frames computed per scene;
$B_{sc}^{B}$, denoting the bitrate of B frames computed per scene;
$B_{sc}^{b}$, denoting the bitrate of b frames computed per scene;
$B_{sc}^{noI}$, denoting the bitrate of P, B, and b frames computed per scene.

9. The method of claim 8, wherein the set of parameters q is derived from at least one of the following GOP/scene-complexity parameters:
$S^{P/I} = S_{gop}^{P}/S_{sc}^{I}$;
$S^{b/I} = S_{gop}^{b}/S_{sc}^{I}$;
$S^{b/P} = S_{gop}^{b}/S_{gop}^{P}$;
$S^{noI/I} = S_{gop}^{noI}/S_{sc}^{I}$;
$B^{P/I} = B_{sc}^{P}/B_{sc}^{I}$;
$B^{b/I} = B_{sc}^{b}/B_{sc}^{I}$;
$B^{b/P} = B_{sc}^{b}/B_{sc}^{P}$;
$B^{noI/I} = B_{sc}^{noI}/B_{sc}^{I}$.

10. The method of claim 1, wherein the impact function $f_{IF}$ depending on the content-dependent parameter $q=q_1$ is given by $$f_{IF}(p,q,\alpha) = \alpha_1 \times \exp(\alpha_2 \times p_1) + \alpha_3 \times q_1 + \alpha_4,$$

wherein $p=p_1$ is a parameter describing the number of bits per pixel and given by $$p_1 = \frac{bitrate \times 10^6}{nx \times fr},$$

and
wherein $\alpha$ ($\alpha_1, \alpha_2, \alpha_3, \alpha_4$) is the set of coefficients associated with the impact function.

11. The method of claim 1, wherein an impact function $f_{IF}$ is used that depends on a set of content-dependent parameters $q=(q_1,q_2)$, each component $q_j$ with $j \in \{1,2\}$ of the set being obtained by a weighted sum of parameters $\beta_{k,i}$ dependent on GOP/scene-complexity parameters.

12. The method of claim 11, wherein the weighted sum for each $j \in \{1, 2\}$ is computed according to $$q_j = \sum_{k=1}^{v} \beta_{k,j} \times R_{k,j}$$

with weights $R_{k,j}$.

13. The method of claim 12, wherein the weights are given by $$R_{k,j} = \sum_i r_i \times (T_k - t_i) \text{ for } j \in \{1, 2\}$$

with $T_k$ being the loss duration of GOP k, $t_i$ being the location in the GOP of a loss event i and $r_i$ denoting the spatial extent of loss event i.

14. The method of claim 13 wherein:
in case of one slice per frame, $$r_i = \frac{nap}{np};$$

and
in case of more than one slice per frame, $$r_i = \frac{nlp}{np} + nle \times \frac{1}{2 \times nsl};$$

wherein np is the number of packets in the frame, nap is the number of affected transport streams (TS) packets in the hit frame, nlp is the number of lost packets in the frame, nle is the number of loss events in the frame, and nsl is the number of slices in the frame.

15. The method of claim 12, wherein:
the parameter $\beta_{k,1}$ depends on the GOP/scene-complexity parameter $S^{noI/I}$.

16. The method of claim 12, wherein:
the parameter $\beta_{k,2}$ depends on the GOP/scene-complexity parameter $S^{b/P}$.

17. The method of claim 12, wherein:
the parameter $\beta_{k,1}$ depends on the GOP/scene-complexity parameter $S^{noI/I}$; and
the parameter $\beta_{k,2}$ depends on the GOP/scene-complexity parameter $S^{b/P}$.

18. The method of claim 12, wherein the parameters $\beta_{k,1}$ for each $k \in \{1, \ldots, v\}$ are obtained by the following steps:
(12a) setting $\beta_{k,1} = S^{noI/I}$;
(12b) in case of $\beta_{k,1} \leq 0.5$, setting $\beta_{k,1}$ to $2 \times \beta_{k,1}$;
(12c) in case of $\beta_{k,1} > 0.5$, setting $\beta_{k,1}$ to 1.

19. The method of claim 12, wherein the parameters $\beta_{k,2}$ for each $k \in (1, \ldots, v)$ are obtained as $\beta_{k,2} = \max(0, -S^{b-P}+1)$.

20. The method of claim 12, wherein the impact function $f_{IF}$ depending on the set of content-dependent parameters $q=(q_1,q_2)$ is given by $$f_{IF}(p, q, \alpha) = \alpha_1 \times \log\left(1 + \frac{\alpha_2 \times q_1 + \alpha_3 \times q_2}{p_1 \times p_2}\right),$$

wherein $p_1$ is a parameter describing the quality impact due to compression artifacts, $p_2$ is the number of GOPs in the measurement window or the measurement window duration, and $\alpha=(\alpha_1, \alpha_2, \alpha_3)$ is the set of coefficients associated with the impact function.

21. The method of claim 1, wherein the video signal is at least part of a non-interactive data stream, preferably a non-interactive video or audiovisual stream, or at least part of an interactive data stream, preferably an interactive video or audiovisual stream.

22. The method of claim 1, wherein the method is combined with one or more methods for estimating the impact on the perception quality of a digital video signal by other impairments than compression and/or transmission.

23. The method of claim 1, wherein the method is combined with one or more other methods for estimating the perception quality of a digital video by compression and/or transmission.

24. The method of claim 22, wherein the combination is performed using at least a linear function and/or at least a multiplicative function of the methods to be combined.

25. A method for monitoring the quality of a transmitted digital video signal, the method comprising the steps of:
   (18a) transmitting the video signal from a server to the client;
   (18b) client-side executing the method for estimating the perception quality of a digital video signal according to claim 1;
   (18c) transferring the result of the estimation of step (18b) to the server;
   (18d) server-side monitoring the estimation of the quality of the transmitted video signal.

26. The method of claim 25, the method comprising the further step:
   (18e) analyzing the monitored quality of the transmitted video signal.

27. The method of claim 26, the method comprising the further step:
   (18f) changing the transmission parameters based on the analysis of step (18e) in order to increase the quality of the transmitted video signal.

28. A system for monitoring the quality of a transmitted digital video signal, the system comprising a server and a client, and the system being configured for executing the method according to claim 25.

29. An apparatus for estimating the perception quality of a digital video signal, the apparatus comprising:
   a processor, configured for extracting information from a video bit stream being captured prior to decoding;
   at least one impact estimator;
   a quality estimator configured for estimating the perception quality Qv of the video signal;
   wherein each of the impact estimator(s) is configured for estimating the quality impact due to an impairment factor by an impairment function taking as input a set of content-dependent parameters q computed from a set of Group Of Picture (GOP)/scene-complexity parameters, wherein the GOP/scene-complexity parameters are derivable from packet-header information and available in case of encrypted video bit streams;
   wherein the set of content-dependent parameters q is derived at least from a GOP/scene-complexity parameter $S_{sc}^{I}$, denoting the average I frame size per scene;
   wherein for estimating at least one of the impairment factors an impact function $f_{IF}$ is used that depends on a content-dependent parameter $q_1$ being computed from the reciprocal of the weighted mean of the GOP/scene-complexity parameter $S_{sc}^{I}$ over the scenes sc multiplied by a coefficient; and
   wherein each scene sc has a weight of $w_{sc} \times N_{sc}$ with $N_{sc}$ being the number of GOPs per scene and $w_{sc}$ being a weight factor, wherein or the scenes having the lowest $S_{sc}^{I}$ value: $w_{sc}$ is set to a value greater than 1, and for all other scenes: $w_{sc}$ is set equal to 1.

30. The apparatus of claim 29, being further configured to estimate the perception quality of a digital video signal.

31. A set top box connectable to a receiver for receiving a digital video signal, wherein the set top box comprises the apparatus according to claim 29.

* * * * *